(12) United States Patent
Webber

(10) Patent No.: US 7,664,640 B2
(45) Date of Patent: Feb. 16, 2010

(54) SYSTEM FOR ESTIMATING PARAMETERS OF A GAUSSIAN MIXTURE MODEL

(75) Inventor: Christopher John St. Clair Webber, Malvern (GB)

(73) Assignee: Qinetiq Limited (GB)

( * ) Notice: Subject to any disclaimer, the term of this patent is extended or adjusted under 35 U.S.C. 154(b) by 811 days.

(21) Appl. No.: 10/509,527

(22) PCT Filed: Mar. 24, 2003

(86) PCT No.: PCT/GB03/01244

§ 371 (c)(1),
(2), (4) Date: Jul. 11, 2005

(87) PCT Pub. No.: WO03/083831

PCT Pub. Date: Oct. 9, 2003

(65) Prior Publication Data

US 2006/0178887 A1    Aug. 10, 2006

(30) Foreign Application Priority Data

Mar. 28, 2002   (GB) .................................. 0207343.5

(51) Int. Cl.
*G01L 15/00* (2006.01)

(52) U.S. Cl. ........................ 704/243; 704/244; 704/245; 704/256

(58) Field of Classification Search ................. 704/243, 704/244, 245, 256

See application file for complete search history.

(56) References Cited

U.S. PATENT DOCUMENTS 5,450,523 A   9/1995   Zhao 5,839,105 A   11/1998   Ostendorf et al.
6,044,344 A *   3/2000   Kanevsky ................ 704/256.7

(Continued)

FOREIGN PATENT DOCUMENTS

WO    WO 02/08783    1/2002

OTHER PUBLICATIONS

Juang et al., "Maximum Likelihood Estimation for Multivariatie Mixture Observations of Markov Chains", IEEE pp. 307-309 (1986).
Gopinath, "Constrained Maximum Likelihood Modeling with Gaussian Distributions" Proc. ARPA Workshop on Human Language Understanding, (1998).

*Primary Examiner*—Daniel D Abebe
(74) *Attorney, Agent, or Firm*—McDonnell Boehnen Hulbert & Berghoff LLP

(57) ABSTRACT

A signal processing system is disclosed which is implemented using Gaussian Mixture Model (GMM) based Hidden Markov Model (HMM), or a GMM alone, parameters of which are constrained during its optimization procedure. Also disclosed is a constraint system applied to input vectors representing the input signal to the system. The invention is particularly, but not exclusively, related to speech recognition systems. The invention reduces the tendency, common in prior art systems, to get caught in local minima associated with highly anisotropic Gaussian components—which reduces the recognizer performance—by employing the constraint system as above whereby the anisotropy of such components are minimized. The invention also covers a method of processing a signal, and a speech recognizer trained according to the method.

41 Claims, 8 Drawing Sheets

U.S. PATENT DOCUMENTS

| | | | |
|---|---|---|---|
| 6,374,221 B1 * | 4/2002 | Haimi-Cohen | 704/256.1 |
| 6,609,093 B1 * | 8/2003 | Gopinath et al. | 704/236 |
| 6,662,160 B1 * | 12/2003 | Wu et al. | 704/256 |
| 6,993,452 B2 * | 1/2006 | Huang et al. | 702/179 |
| 7,295,978 B1 * | 11/2007 | Schwartz et al. | 704/240 |
| 2002/0069032 A1 * | 6/2002 | Huang et al. | 702/179 |

* cited by examiner

SYSTEM FOR ESTIMATING PARAMETERS OF A GAUSSIAN MIXTURE MODEL

BACKGROUND OF THE INVENTION

1. Field of the Invention

This invention relates to a system and method for processing signals to aid their classification and recognition. More specifically, the invention relates to a modified process for training and using both Gaussian Mixture Models and Hidden Markov Models to improve classification performance, particularly but not exclusively with regard to speech.

2. Description of the Art

Gaussian Mixture Models (GMMs) and Hidden Markov Models (HMMs) are often used in signal classifiers to help identify an input signal when given a set of example inputs, known as training data. Uses of the technique include speech recognition, where the audio speech signal is digitised and input to the classifier, and the classifier attempts to generate from its vocabulary of words the set of words most likely to correspond to the input audio signal. Further applications include radar, where radar signal returns from a scene are processed to provide an estimate of the contents of the scene, and in image processing. Published International specification WO02/08783 demonstrates the use of Hidden Markov Model processing of radar signals.

Before a GMM or HMM can be used to classify a signal, it must be trained with an appropriate set of training data to initialise parameters within the model to provide most efficient performance. There are thus two distinct stages associated with practical use of these models, the training stage and the classification stage. With both of these stages, data is presented to the classifier in a similar manner. When applied to speech recognition, a set of vectors representing the speech signal is typically generated in the following manner. The incoming audio signal is digitised and divided into 10 ms segments. The frequency spectrum of each segment is then taken, with windowing functions being employed if necessary to compensate for truncation effects, to produce a spectral vector. Each element of the spectral vector typically measures the logarithm of the integrated power within each different frequency band. The audible frequency range is typically spanned by around 25 such contiguous bands, but one element of the spectral vector is conventionally reserved to measure the logarithm of the integrated power across all frequency bands, i.e. the logarithm of the overall loudness of the sound Thus, each spectral vector conventionally has around 25+1=26 elements; in other words, the vector space is conventionally 26-dimensional. These spectral vectors are time-ordered and constitute the input to the HMM or GMM, as a spectrogram representation of the audio signal.

Training both the GMM and HMM involve establishing an optimised set of parameters associated with the processes using training data, such that optimal classification occurs when the model is subjected to unseen data.

A GMM is a model of the probability density function (PDF) of its input vectors (e.g. spectral vectors) in their vector space, parameterised as a weighted sum of Gaussian components, or classes. Available parameters for optimisation are the means and covariance matrices for each class, and prior class probabilities. The prior class probabilities are the weights of the weighted sum of the classes. These adaptive parameters are typically optimised for a set of training data by an adaptive, iterative, re-estimation procedure such as the Expectation Maximisation (EM), and log-likelihood gradient ascent algorithms, which are well known procedures for finding a set of values for all the adaptive parameters that maximises the training-set average of the logarithm of the model's likelihood function (log-likelihood). These iterative procedures refine the values of the adaptive parameters from one iteration to the next, starting from initial estimates, which may just be random numbers lying in sensible ranges.

Once the adaptive parameters of a GMM have been optimised, those trained parameters may subsequently be used for identifying the most likely of the set of alternative models for any observed spectral vector, i.e. for classification of the spectral vector. The classification step involves the conventional procedure for computing the likelihood that each component of the GMM could have given rise to the observed spectral vector.

Whereas a GMM is a model of the PDF of individual input vectors irrespective of their mutual temporal correlations, a HMM is a model of the PDF of time-ordered sequences of input vectors. The adaptive parameters of an ordinary HMM are the observation probabilities (the PDF of input vectors given each possible hidden state of the Markov chain) and the transition probabilities (the set of probabilities that the Markov chain will make a transition between each pair-wise combination of possible hidden states).

A HMM may model its observation probabilities as Gaussian PDFs (otherwise known as components, or classes) or weighted sums of Gaussian PDFs, i.e. as a GMM. Such HMMs are known as GMM based HMMs. The observation probabilities of a GMM-based HMM are parameterised as a GMM, but the GMM-based HMM is not itself a GMM. An input stage can be added to a GMM based HMM however, where this input stage comprises a simple GMM. The log-likelihood of a GMM-based HMM is the log-likelihood of an HMM whose observation probabilities are constrained to be parameterised as GMMs; it is not the log-likelihood of a GMM. Consequently, the optimisation procedure of a GMM-based HMM is not the same as that of a GMM. However, a prescription for optimising a GMM based HMM's observation probabilities can be re-cast as a prescription for optimising the associated GMM's class means, covariance matrices and prior class probabilities.

Training, or optimisation, of the adaptive parameters of a HMM is done so as to maximise the overall likelihood function of the model of the input signal, such as a speech sequence. One common way of doing this is to use the Baum-Welch re-estimation algorithm, which is a development of the technique of expectation maximisation of the model's log-likelihood function, extended to allow for the probabilistic dependence of the hidden states on their earlier values in the speech sequence. A HMM is first initialised with initial, possibly random, assumptions for the values of the transition and observation probabilities.

For each one of a set of sequences of input training vectors, such as speech-sequences, the Baum-Welch forward-backward algorithm is applied, to deduce the probability that the HMM could have given rise to the observed sequence. On the basis of all these per-sequence model likelihoods, the Baum-Welch re-estimation formula updates the model's assumed values for the transition probabilities and the observation probabilities (i.e. the GMM class means, covariance matrices and prior class probabilities), so as to maximise the increase in the model's average log-likelihood. This process is iterated, using the Baum-Welch forward-backward algorithm to deduce revised model likelihoods for each training speech-sequence and, on the basis of these, using the Baum-Welch re-estimation formula to provide further updates to the adaptive parameters.

Each iteration of the conventional Baum-Welch re-estimation procedure can be broken down into five steps for every GMM-based HMM: (a) applying the Baum-Welch forward-backward algorithm on every training speech-sequence, (b) the determination of what the updated values of the GMM class means should be for the next iteration, (c) the determination of what the updated values of the GMM class covariance matrices should be for the next iteration, (d) the determination of what the updated values of the GMM prior class probabilities should be for the next iteration, and (e) the determination of what the updated values of the HMM transition probabilities should be for the next iteration. Thus, the Baum-Welch re-estimation procedure for optimising a GMM-based HMM can be thought of as a generalisation of the EM algorithm for optimising a GMM, but with the updated transition probabilities as an extra, fourth output.

For certain applications, HMMs are employed that do not have their observation probabilities parameterised as GMMs, but instead use lower level HMMs. Thus, a hierarchy is formed that comprises at the top a "high level" HMM, and at the bottom a GMM, with each layer having its observation probabilities defined by the next stage down. This technique is common in subword-unit based speech recognition systems, where the structure comprises two nested levels of HMM, with the lowest one having GMM based observation probabilities.

The procedure for optimising the observation probabilities of a high-level HMM reduces to the conventional procedure for optimising both the transition probabilities and the observation probabilities (i.e. the GMM parameters) of the ordinary HMMs at the lower level, which is as described above. The procedure for optimising the high-level HMM's transition probabilities is the same as the conventional procedure for optimising ordinary HMMs' transition probabilities, which is as described above.

HMMs can be stacked into multiple-level hierarchies in this way. The procedure for optimising the observation probabilities at any level reduces to the conventional procedure for optimising the transition probabilities at all lower levels combined with the conventional procedure for optimising the GMM parameters at the lowest level. The procedure for optimising the transition probabilities at any level is the same as the conventional procedure for optimising ordinary HMMs' transition probabilities. Thus, the procedure for optimising hierarchical HMMs can be described in terms of recursive application of the conventional procedures for optimising the transition and observation probabilities of ordinary HMMs.

Once the HMM's adaptive parameters have been optimised, the trained HMM may subsequently be used for identifying the most likely of a set of alternative models of an observed sequence of input vectors—spectral vectors in the case of speech classification, and complex amplitude or image data in the case of radar and other images. This process conventionally is achieved using the Baum-Welch forward-backward algorithm, which computes the likelihood of generating the observed sequence of input vectors from each of a set of alternative HMMs with different optimised transition and observation probabilities.

The classification methods described above have certain disadvantages. When optimising the observation probabilities of the GMMs, and hence of the HMMs that may be hierarchically above them, as well as the transition probabilities of the HMM, there is a tendency for the optimisation to get caught in local minima, which prevents the system from achieving optimal classification. This can often be attributed to a tendency for class likelihood-PDFs to become "tangled up" with one another if they are free to become too highly anisotropic. Also, regarding speech recogniser technology, current recognisers are poor at capturing subtle variations and intrinsic characteristics of real speech, such as the full, specific variability of speakers' vowels under very different speaking conditions. In particular, individual vowels occupy complex shapes in spectral vector space, and attempting to represent these shapes as Gaussian distributions, as is conventionally done, can lead to unfaithful representation of the speech sounds.

SUMMARY OF THE INVENTION

According to the present invention there is provided a signal processing system for processing a plurality of multi-element data encoding vectors, the system:

having means for deriving the data encoding vectors from input signals;

being arranged to process the data encoding vectors using a Gaussian Mixture Model (GMM), the GMM having at least one class mean vector having multiple elements;

being arranged to process the elements of the class mean vector(s) by an iterative optimisation procedure;

characterised in that the system is also arranged to scale the elements of the class mean vector(s) during the optimisation procedure to provide for the class mean vector(s) to have constant modulus at each iteration, and to normalise the data encoding vectors input to the GMM.

Preferably the moduli of the mean vectors of each of the GMMs are rescaled after each iteration of the optimisation procedure so that they are all of equal value.

Most signal processing systems of the type discussed in this specification incorporate a GMM that represents the probability density function of all data encoding vectors in the training sequence. The constraint of limiting the elements of the class mean vector to have constant modulus leads to simplified processing of the GMMs making up the signal processing system, as the class means of each GMM will lie on the surface of a hypersphere having dimensionality (n−1), where n is the dimension of an individual vector.

Preferably a covariance matrix associated with the GMM is constrained so as to be isotropic and diagonal, and to have a variance constrained to be a constant value. This eliminates the possibility of certain classes of severe local minima associated with highly anisotropic Gaussian components, and so prevents such sub-optimal configurations from forming during the training process. Note that a covariance matrix that is so constrained may be regarded mathematically as a scalar value, and hence a scalar value may be used to represent such a covariance matrix.

Eliminating certain classes of local minima, by employing the novel constraints of the present invention, may have very significant and novel extra advantages (over and above the need to limit or avoid local minima if possible) under certain circumstances. These circumstances occur whenever the probability distribution function (PDF) of the data-encoding vectors is invariant with respect to orthogonal symmetries such as permutation transformations. Eliminating certain classes of local minima by employing the novel constraints of the present invention may, under these circumstances, enable the class means of the GMM themselves to become symmetric under these same symmetry transformations after adaptation procedures such as the well-known expectation maximisation (EM) algorithm. This provides a means for such adaptation procedures to derive GMMs whose posterior class probabilities are invariant with respect to these same symmetry transformations; this attribute will be useful for producing transformation-robust pattern recognition systems.

Each GMM, and therefore GMM based HMM, has a set of prior class probabilities. Preferably the prior class probabilities associated with the GMM are constrained to be equal, and to remain constant throughout the optimisation procedure.

Prior art signal processing systems incorporating GMMs generally avoid putting constraints on the model parameters; other than that covariance matrices are on occasion constrained to be equal across classes, requirements are rarely imposed on the class means, covariance matrices, prior class probabilities and hidden-state transition probabilities other than that their values are chosen to make the average log-likelihood as large as possible.

Preferably, each data encoding vector that is also an input vector, derived from the input signal during both training and classifying stages of using the GMM is constrained such that its elements $x_i$ are proportional to the square roots of the integrated power within different frequency bands. Advantageously, the elements of each such data encoding vector are scaled such that the squares of the elements of the vector sum to a constant value that is independent of the total power of the original input.

Preferably each such data encoding vector is augmented with the addition of one or more elements representing the overall power in the vector. The scaling of the vector elements described above removes any indication of the power, so the additional element(s) provide the only indication of the power, or loudness, within the vector. Clearly, the computation of the value of the elements representing power would need to be based on pre-scaled elements of the vector.

Note that in this specification the terms "input vector" and "spectral vector" are used interchangeably in the context of providing an input to the lowest level of the system hierarchy. The vector at this level may represent the actual power spectrum of the input signal, and hence be spectral coefficients, or may represent some modified form of the power spectrum. In practice, the input vector will generally represent a power spectrum of a segment of a temporal input signal, but this will not be the case for all applications. Further processing of the temporal input signal is used in some applications, e.g. cosine transform. A "data encoding vector" is, within this specification, any vector that is used as an input to any level of the hierarchy, depending on the context, i.e. any vector that is used as the direct input to the particular level of the hierarchy being discussed in that context. A data encoding vector is thus an input vector only when it represents the information entering the system at the lowest level of the hierarchy.

Note also that normalising a vector is the process of rescaling all its elements by the same factor, in order to achieve some criterion defined on the whole vector of elements. What that factor is depends on the criterion chosen for normalisation. A vector can generally be normalised by one of two useful criteria; one is to normalise such that the elements sum to a constant after normalisation, the other is to normalise such that the squares of the elements sum to a constant after normalisation. By the first criterion, the rescaling factor should be proportional to the reciprocal of the sum of the values of the elements before normalisation. By the second criterion, the rescaling factor should be proportional to the reciprocal of the square root of the sum of the squares of the values of the elements before normalisation. A vector of exclusive probabilities is an example of a vector normalised by the first criterion, such that the sum of those probabilities is 1. A (real-valued) unit vector is an example of a vector normalised according to the second criterion; the sum of the squares of the elements of a (real-valued) unit vector is 1. A vector whose elements comprise the square roots of a set of exclusive probabilities is also an example of a vector normalised by the second criterion.

Note that for the purposes of this specification, any reference to GMMs should be taken to include Exponential Mixture Models (EMMs). EMMs, may be regarded as a special case of GMMs because one can derive equations and procedures for optimising simple EMMs and EMM based HMMs by setting constant the moduli |x| and |w| of the GMM's data-encoding vector and class means respectively and constructing the GMM's covariance matrix to be isotropic in the conventional EM algorithm for simple GMMs or the conventional Baum-Welsh re-estimation procedure for GMM based HMMs. Nevertheless, the equations and procedures so derived are valid for EMMs even when |x| and |w| are not constant, and they constitute valid prescriptions for optimising general EMMs.

According to a further aspect of the present invention there is provided a signal processing system for processing a plurality of multi-element data encoding vectors, the system:

having means for deriving the data encoding vectors from input signals;

being arranged to process the data encoding vectors using a Gaussian Mixture Model (GMM) based Hidden Markov Model (HMM), the GMM based HMM having at least one class mean vector having multiple elements;

being arranged to process the elements of the class mean vector(s) by an iterative optimisation procedure;

characterised in that the system is also arranged to scale the elements of the class mean vector(s) during the optimisation procedure to provide for the class mean vector(s) to have constant modulus at each iteration, and to normalise the data encoding vectors input to the GMM based HMM.

The invention as described herein may equally well be applied to a system that employs only GMMs, or that employs GMM based HMMs, or indeed that employs GMM based HMMs whose data-encoding vectors are derived from the posterior class probabilities of separate, low level, GMMs.

Note that the constraints and conditions that may be imposed on GMM parameters as discussed above, including the mean vectors and covariance matrix, and prior class probabilities, may also be imposed on equivalent parameters of the GMM based HMM. Likewise, the processing applied to data encoding vectors as described above for use with a GMM based system may equally well be applied to a GMM based HMM system.

Certain applications, notably subword-unit based models, advantageously employ a HMM that uses as its observation probability a GMM constrained according to the current invention, wherein the HMM acts as the observation probability for a further HMM. In this way, a hierarchy of HMMs can be built up, in the manner of the prior art, but with the difference that the constraints on the model parameters according to the current invention are applied at each level of the hierarchy.

Advantageously, the hierarchy may incorporate two GMMs as two lower levels, with a HMM at the highest level. The lowest level GMM provides posterior probabilities as a data encoding vector to a second, higher level GMM. This second GMM provides observation probabilities to a HMM at the third level. This arrangement allows individual speech-sounds to be represented in the spectral-vector space not as individual Gaussian ellipsoids, as is conventional, but as assemblies of many smaller Gaussian hypercircles tiling the unit hypersphere, offering in the potential for more faithful representation of highly complex-shaped speech-sounds, and thus improved classification performance.

According to another aspect of the current invention there is provided a method of processing a signal, the signal comprising a plurality of multi-element data encoding vectors, wherein the data encoding vectors are derived from an analogue or digital input, and where the method employs at least one Gaussian Mixture Model (GMM) or GMM based Hidden Markov Model (HMM), the GMM or GMM based HMM having at least one class mean vector having multiple elements, and the elements of the class mean vector(s) are optimised in an iterative procedure, characterised in that the elements of the class mean vectors are scaled during the optimisation procedure such that the class mean vectors have a constant modulus at each iteration, and the data encoding vectors input to the GMM or GMM based HMM are processed such that they are normalised.

Note that the user(s) of a system trained according to the method of the current invention may be different to the user(s) who performed the training. This is due to the distinction between the training and the classification modes of the invention According to another aspect of the current invention there is provided a computer program designed to run on a computer and arranged to implement a signal processing system for processing one or more multi-element input vectors, the system:

having means for deriving the data encoding vectors from input signals;

being arranged to process the data encoding vectors using at least one of a Gaussian Mixture Model (GMM) and a GMM based Hidden Markov Model (HMM), the GMM or GMM based HMM having at least one class mean vector having multiple elements;

being arranged to process the elements of the class mean vector(s) by an iterative optimisation procedure;

characterised in that the system is also arranged to scale the elements of the class mean vector(s) during the optimisation procedure to provide for the class mean vector(s) to have constant modulus at each iteration, and to normalise the data encoding vectors input to the GMM or GMM based HMM.

The present invention can be implemented on a conventional computer system. A computer can be programmed to so as to implement a signal processing system according to the current invention to run on the computer hardware.

According to another aspect of the current invention there is provided a speech recogniser incorporating a signal processing system for processing one or more multi-element input vectors, the recogniser:

having means for deriving the data encoding vectors from input signals;

being arranged to process the data encoding vectors using at least one of a Gaussian Mixture Model (GMM) and a GMM based Hidden Markov Model (HMM), the GMM or GMM based HMM having at least one class mean vector having multiple elements;

being arranged to process the elements of the class mean vector(s) by an iterative optimisation procedure;

characterised in that the system is also arranged to scale the elements of the class mean vector(s) during the optimisation procedure to provide for the class mean vector(s) to have constant modulus at each iteration, and to normalise the data encoding vectors input to the GMM or GMM based HMM.

A speech recogniser may advantageously incorporate a signal processing system as described herein, and may incorporate a method of signal processing as described herein.

DESCRIPTION OF THE FIGURES

The current invention will now be described in more detail, by way of example only, with reference to the accompanying Figures, of which.

DESCRIPTION OF A PREFERRED EMBODIMENT

Figure 1:
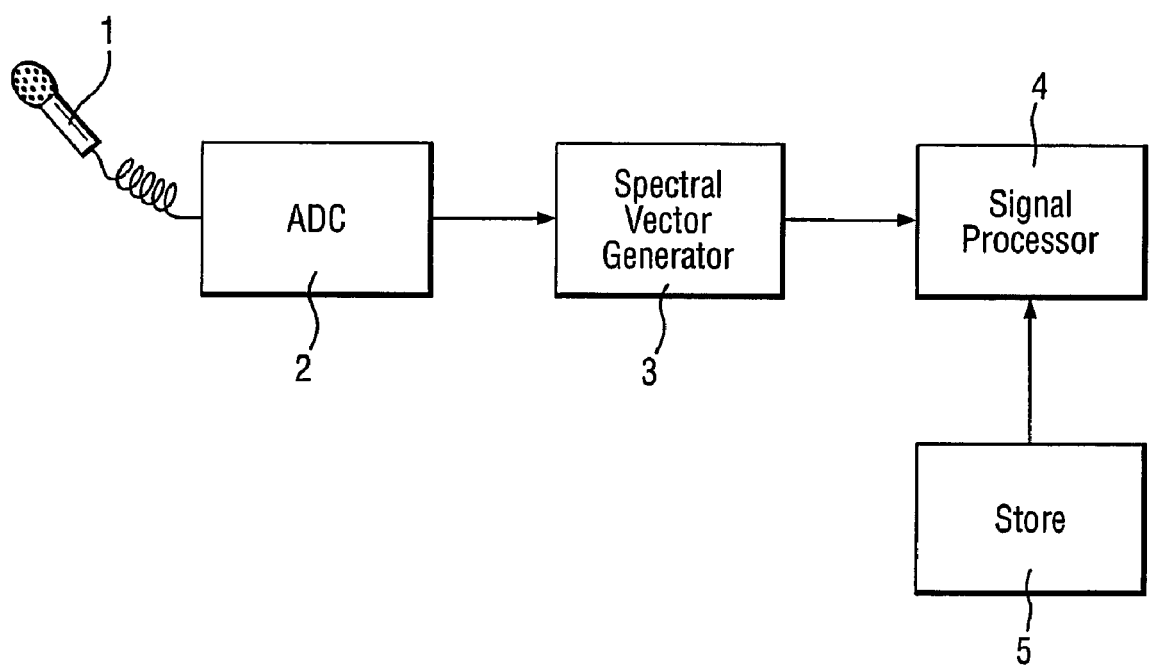
FIG. 1 diagrammatically illustrates a typical hardware arrangement suitable for use with the current invention when implemented in a speech recogniser.

The current invention would typically be implemented on a computer system having some sort of analogue input, an analogue to digital converter, and digital processing means. The digital processing means would comprise a digital store and a processor. As shown in FIG. 1, a speech recogniser embodiment typically has a microphone 1 acting as a transducer from the speech itself, the electrical output of which is fed to an analogue to digital converter (ADC) 2. There may also be some analogue processing before the ADC (not shown). The ADC feeds its output to a circuit 3 that divides the digital signal into 10 ms slices, and carries out a spectral analysis on each slice, to produce a spectral vector. These spectral vectors are then fed into the signal processor 4, in which is implemented the current invention. The signal processor 4 will have associated with it a digital storage 5. Some applications may have as an input a signal that has been digitised at some remote point, and so wouldn't have the ADC. Other hardware configurations are also possible within the scope of the current invention.

A typical signal processing system of the current invention will comprise a simple GMM and a GMM-based HMM, together used to classify an input signal. Before either of those models can be used for classification purposes, they must first be optimised, or trained, using a set of training data. There are thus two distinct modes of operation of a classification model: the training phase, and the classification phase.

Figure 2:
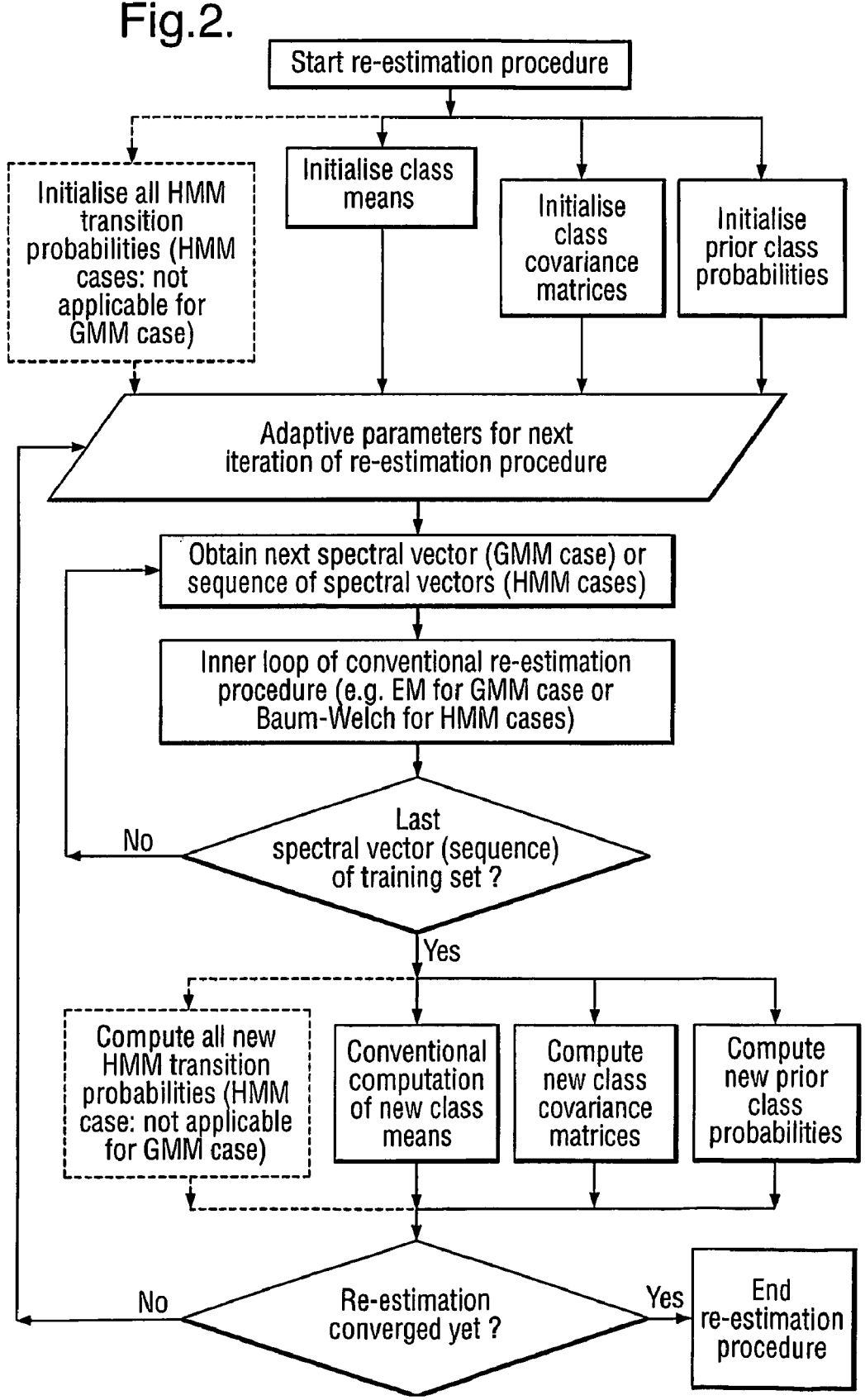
FIG. 2 shows in block diagrammatic form the conventional re-estimation procedure adopted by the prior art systems employing GMM or HMM based classifiers.

FIG. 2 shows generically the steps used by prior art systems in training both a GMM and a HMM based classifier. FIG. 2 depicts the optimisation of hierarchical GMM-based HMMs as well as the optimisation of ordinary GMM-based HMMs and simple GMMs, because the steps relating to initialising and re-estimating HMM transition probabilities relate to the initialisation and re-estimation of HMM transition probabilities at all levels of the hierarchy. The flow chart is entered from the top when it is required to establish an improved set of parameters in the model to improve the classification performance. First the various classes need to be initialised, these being the class means, class covariance matrices and prior class probabilities. HMMs have the additional step of initialising the transition probabilities. These initialisation values may be random, or they may be a "best guess" resulting either from some previous estimation procedure or from some other method.

These initialisations form the adaptive parameters for the first iteration of the training procedure, which proceeds as follows. An data encoding vector or vector sequence (for the HMM case) from the training sequence is obtained, and processed using a known re-estimation procedure. For GMMs the EM algorithm is often used, and for HMMs the Baum-Welch re-estimation procedure is commonplace. This is the inner loop of the re-estimation procedure, and is carried out for all data encoding vectors in the training sequence.

Following this, the information gained during the inner loop processing is used to compute the new classes and, for the HMM case, the new transition probabilities. Convergence of this new data is tested by comparing it with the previous set or by judging whether the likelihood function has achieved a stable minimum, and the process re-iterated if necessary using the newly computed data as a starting point.

Moving to the current invention, one embodiment of the current invention applied to speech recognition employs a modified spectral vector that is pre-processed in a manner that is different from the conventional log-power representation of the prior art. The spectral vector itself comprises a spectral representation of a 10 ms slice of speech, divided up into typically 25 frequency bins.

The objective of the first stage of the pre-processing is that elements $x_i$ (i=1, ..., m) of the n-dimensional (m≦n) spectral vector x should be proportional to the square roots $\sqrt{P_i}$ of integrated power $P_i$ within different frequency bands, rather than the conventional logarithms of integrated power within different frequency bands. Further, elements $x_i$ (i=1, ..., m) should be scaled such that their squares should sum to a constant A that is independent of the total power integrated across all frequency bands within the frame corresponding to that spectral vector. Thus, if the frame is sampled into m frequency bands, m of the elements $x_i$ of the n-dimensional (m≦n) spectral vector x should satisfy $$x_i = \sqrt{\frac{AP_i}{\sum_{j=1}^{m} P_j}} \quad (i = 1, \ldots, m) \quad \text{(Equation 1)}$$

which implies $$\sum_{j=1}^{m} x_j^2 = A.$$

The value of the constant A has no functional significance; all that matters is that it doesn't change from one spectral vector to the next. The advantage of this normalised square root power representation for spectral vectors is that the degree of match of the shape of spectral vector $x_i$ (i=1, ..., m), compared with a class mean vector $w_i$ (i=1, ..., n), is then proportional to the scalar product $$\sum_{i=1}^{m} x_i w_i,$$

irrespective of the modulus (vector length) of the template. This provides the freedom to constrain the modulus of the template without losing the functionality of being able to determine the degree of match of the template by computing the scalar product.

The steps involved in the novel encoding of spectral vectors are represented in the flow diagram of FIG. 3 and listed as follows (a-e). After (a) choosing a value for the constant A to be used for all frames of speech, (b) the first step to be applied for each individual frame of speech is the same as the conventional process for conducting a spectral analyisis in order to obtain m values of the integrated power $P_i$ (i=1, ..., m) within m different frequency bands spanning the audible frequency range. Then, instead of taking the logarithms of these power-values as is conventional in the prior art, (c) their sum $$\sum_{j=1}^{m} P_j$$

and (d) their square roots $\sqrt{P_i}$ (i=1, ..., m) are computed. (e) each square-root value $\sqrt{P_i}$ is then divided by the square root of total power $$\sum_{j=1}^{m} P_j$$

(and multiplied by a constant scaling factor A as desired) to obtain elements $x_i$ (i=1, ..., m) of the novel encoding of the spectral vector defined by equation 1.

As a second part of the pre-processing of the spectral vectors, the vector is also augmented with the addition of extra elements that represent the overall loudness of the speech at that frame, i.e. the total power $$\sum_{j=1}^{m} P_j$$

integrated across all frequency bands.

This is particularly useful in conjunction with the novel way of encoding spectral shape defined by equation 1. This is because elements $x_i$ (i=1, ..., m) defined by equation 1 are clearly independent of the overall loudness $$\sum_{j=1}^{m} P_j$$

and therefore encode no information about it, so those m elements need to be augmented with additional information if the spectral vector is to convey loudness information.

In the current embodiment, two extra elements $x_{m+1}$ and $x_{m+2}$ are added to the spectral vector, beyond the m elements used to encode the spectral shape. Thus the spectral vector will have n=m+2 dimensions. These two elements depend on the overall loudness $$L \equiv \sum_{j=1}^{m} P_j$$

in the following way:

$$x_{m+1} = B \frac{f(L)}{\sqrt{[f(L)]^2 + [g(L)]^2}},$$ (Equation 2)

$$x_{m+2} = B \frac{g(L)}{\sqrt{[f(L)]^2 + [g(L)]^2}}$$

where f( ) and g( ) are two (different) functions of the overall loudness L, and B is a constant. The significance of B is that the ratio B/A determines the relative contributions to the squared modulus $$|x|^2 = x \cdot x = \sum_{j=1}^{n} x_j^2$$

made by the two subsets of elements (i=m+1, m+2) and (i=1, ..., m); the values of these contributions are clearly $B^2$ and $A^2$ respectively. The ratio B/A may therefore be used to control the relative importance assigned to overall loudness and spectral shape in the coding of spectral vectors; for example, choosing B=0 assigns no importance to overall loudness, while choosing similar values of A and B assigns similar importance to both aspects of the speech. The value of $A^2+B^2$ can be chosen to be 1 for simplicity, which will make the squared modulus $$|x|^2 = x \cdot x = \sum_{j=1}^{n} x_j^2 = A^2 + B^2$$

equal to 1 for all spectral vectors regardless of their speech content.

The advantages of this novel representation of loudness are (a) that the moduli of all spectral vectors will have the same constant value regardless of overall loudness, which frees one to constrain the moduli of templates (class means) $w=(w_1, \ldots, w_n)$, as is proposed in the main claims, and (b) that the ratio B/A may be used to control the relative importance assigned to overall loudness and spectral shape in the coding of spectral vectors. Possible choices for the functions f( ) and g( ) include $$f(L) = \sin\left(\frac{\pi}{2} \frac{\log L - \log L^{min}}{\log L^{max} - \log L^{min}}\right),$$ (Equation 3)

$$g(L) = \cos\left(\frac{\pi}{2} \frac{\log L - \log L^{min}}{\log L^{max} - \log L^{min}}\right)$$

where $L^{min}$ and $L^{max}$ are constants chosen to correspond to the quietest and loudest volumes (total integrated power) typically encountered in individual frames of speech.

Useful values for the pair of constants (A,B) are (1,0), $$\left(\frac{1}{\sqrt{2}}, \frac{1}{\sqrt{2}}\right) \text{ and } \left(\sqrt{\frac{2}{n}}, \sqrt{\frac{m}{n}}\right),$$

which all satisfy $A^2+B^2=1$.

Once functions f( ) and g( ) and constants B, $L^{min}$ and $L^{max}$, to be used for all frames of speech, have been chosen, the steps involved in the process required to incorporate the loudness encoding as described above are shown in FIG. 4. The process involves (a) summing the integrated powers $P_i$ within m frequency ranges i=1, ..., m for each frame of speech to obtain the overall loudness L for that frame of speech, (b) evaluating the two extra elements $x_{m+1}$ and $x_{m+2}$ for that frame of speech according to equation 2, and (c) for that frame of speech appending the two extra elements to the m elements obtained from the process of FIG. 4 to obtain an n=m+2 dimensional spectral vector incorporating the novel encodings of spectral shape and loudness.

Figure 3:
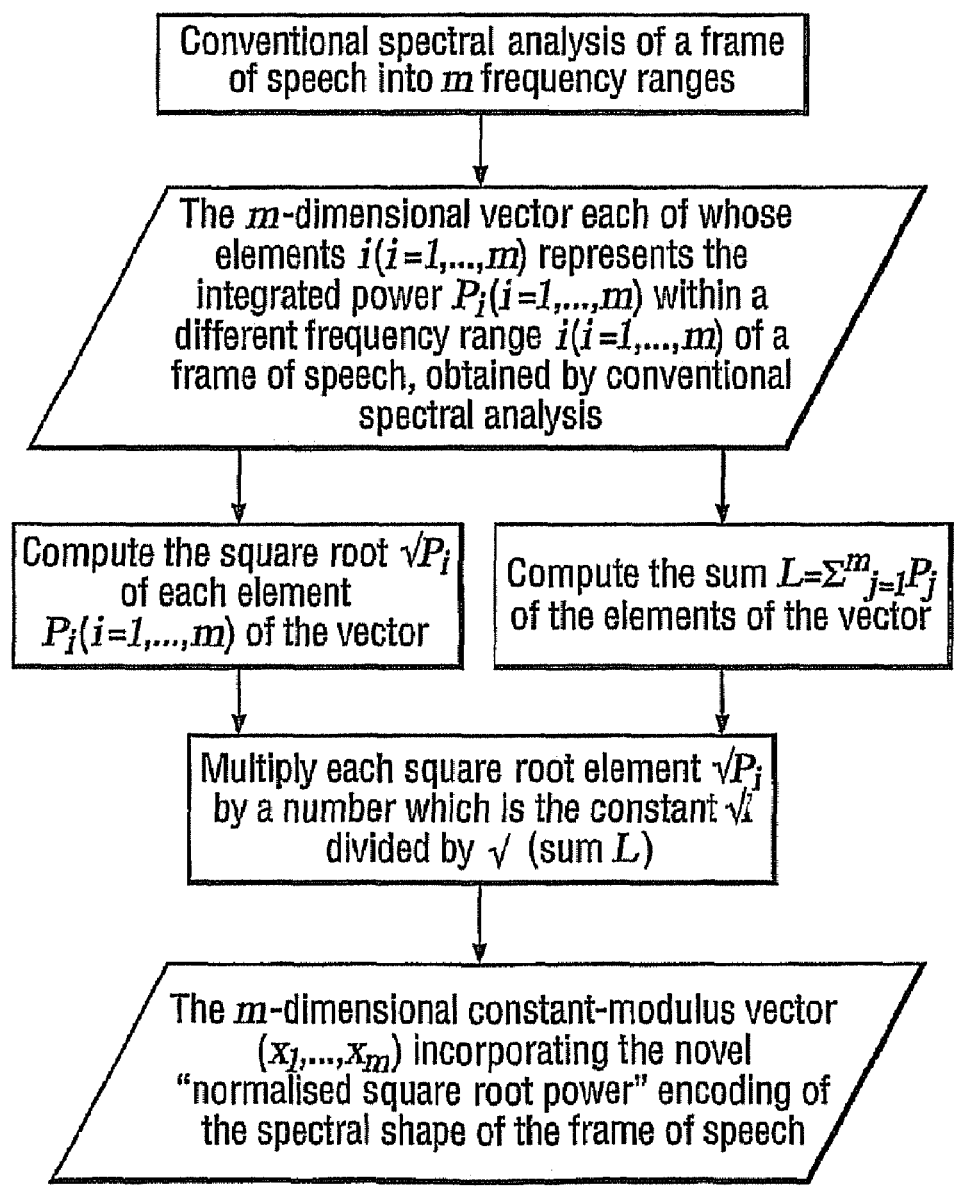
FIG. 3 shows in block diagrammatic form one of the pre-processing stages carried out on input vectors based on frames of speech, relating to the frame's spectral shape.
Figure 4:
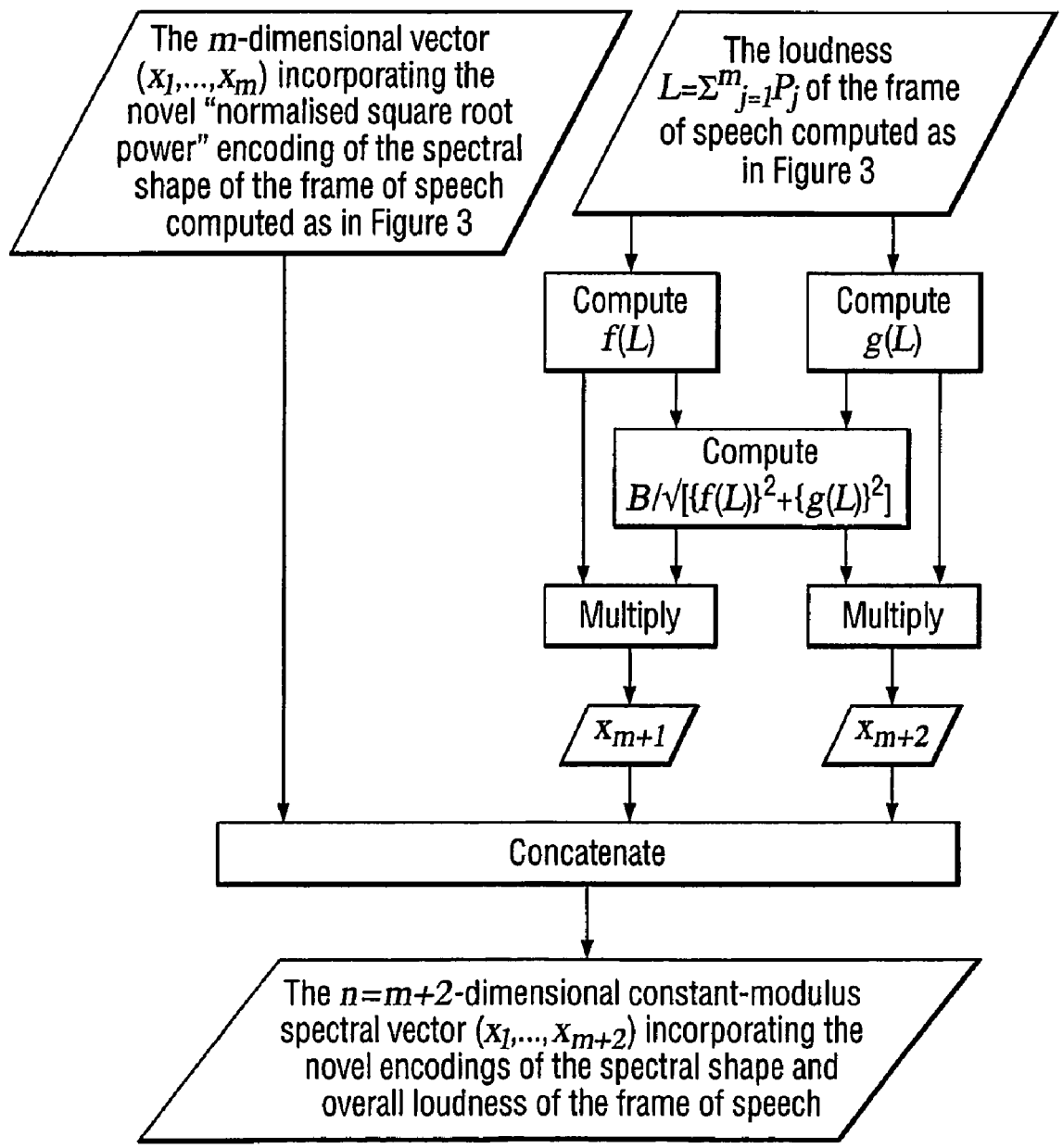
FIG. 4 shows in block diagrammatic form a further pre-processing stage carried out on the input vectors relating to the overall loudness of a frame of speech.

The steps as shown in FIGS. 3 and 4 comprise the pre-processing of the spectral vectors according to the embodiment of the current invention.

The input vectors pre-processed as described above are used when optimising the various parameters of the GMMs and GMM-based HMMs. The inner loop of the optimisation procedure, as described in relation to FIG. 1 above, is done using convention methods such as EM re-estimation and Baum-Welch re-estimation, respectively. Further novel stages are concerned with applying constraints to the parameters in between iterations of this inner loop.

Figure 5:
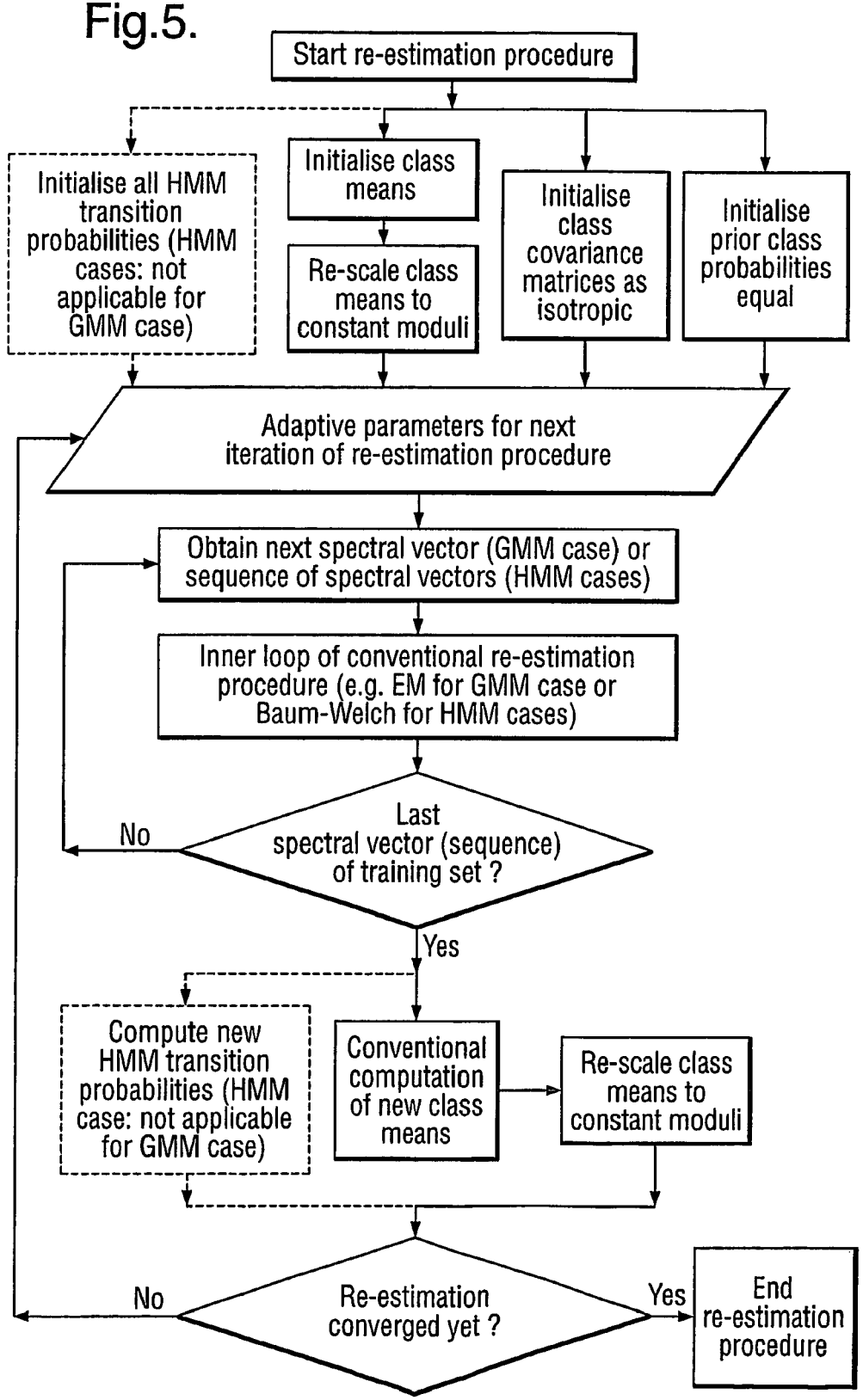
FIG. 5 shows in block diagrammatic form the modified re-estimation procedure of GMMs or ordinary, or hierarchical HMMs as per the current invention.

FIG. 5 shows the re-estimation procedure of the current invention, with additional processes present as compared to that shown in FIG. 2. These additional processes relate to the initialisation of the classes before the iterative part of the procedure starts, and to the resealing of the class means following each iteration to take into account the constraints to be imposed. Note that for the HMM case the transition probability processing is unchanged from the prior art.

One of the constraints applied in between iterations of the inner loop is concerned with the class mean vectors of the GMM or HMM. The constraint takes the form of re-scaling the set of n-dimensional vectors $w_j=(w_{j1}, \ldots w_{jn})$ which represent the class means.

This constraint is applied to all the class means, as soon as they have been re-estimated, every time they are re-estimated (by the EM or Baum-Welch re-estimation procedures for example), and also when they are first initialised (see FIG. 5). These extra steps, illustrated in the flow diagram of FIG. 5, are (a) by summing the squares of its elements and then taking the square root of the sum, the modulus $|w_j|$ of each of the N re-estimated class means $w_j$ is first computed as $$|w_j| = \sqrt{\sum_{i=1}^{n} w_{ji}^2}$$ (Equation 4)

for all N classes j=1, ..., N; (b) after computing the modulus $|w_j|$ of each re-estimated class mean, all the elements of each class mean are divided by that corresponding modulus, i.e.

$$w_{ji} \rightarrow D\frac{w_{ji}}{|w_j|}, \text{ for all elements } i = 1, \ldots, n \text{ of all} \quad \text{(Equation 5)}$$

$$GMM \text{ classes } j = 1, \ldots, N$$

These steps have the effect or re-scaling all the class means $w_j$ to constant modulus D until the next iteration of their re-estimation, after which they are re-scaled again to constant modulus D by applying these steps again, as depicted in FIG. 5. The value of the constant D is preferably set equal to the modulus |x| of the data vectors x. (For example, for a GMM receiving input data having moduli $|x|=\sqrt{A^2+B^2}$, the value of D should be set equal to $\sqrt{A^2+B^2}$.)

The advantages of re-scaling the class means to constant modulus are that this encourages speech recognition algorithms to adopt novel encodings of speech data that may improve speech classification performance (such as hierarchical sparse coding), and that it may reduce the vulnerability of speech recognition algorithms to becoming trapped in undesirable sub-optimal configurations ('local minima') during training. These advantages result from the fact that the dynamics of learning have simplified degrees of freedom because the class means are constrained to remain on a hypersphere (of radius D) as they adapt.

Re-scaling class means $w_j$ to constant modulus is particularly appropriate in conjunction with scaling data vectors x to constant modulus. This is because the degree of match between a data vector x and a class mean $w_j$ can then determined purely by computing the scalar product $w_j \cdot x$.

Further to this embodiment of the current invention, the covariance matrices $C_j$ of the Gaussian distributions that constitute the GMMs are constrained to be isotropic and of constrained variance V, i.e. they are not optimised according to the conventional re-estimation procedures for covariance matrices (such as the EM algorithm for GMMs and the Baum-Welch procedure for GMM-based HMMs), but are defined once and for all in terms of the isotropic Identity Matrix I and the constrained variance V by $$C_j = VI \text{ for all classes } j=1, \ldots, N \quad \text{(Equation 6)}$$

V is a free parameter chosen (for example by trial and error) to give the speech recognition system best classification performance; V must be greater than zero, as a covariance matrix has non-negative eigenvalues, and V is preferably significantly smaller than the value of $D^2$. The benefit of setting V much smaller than $D^2$ is that it leads to a sparse distribution of the first level simple GMM's posterior probabilities, which in the main embodiment feed the data encoding vector space of the GMM-based HMM at the second level. This is because each Gaussian component of the first level simple GMM will individually only span a small area on the spectral vector hypersphere.

This process for choosing covariance matrices involves the following steps: (a) choosing a value for the constant of proportionality V so as to optimise the classification performance, for example by trial and error, (b) setting all the diagonal elements of the class covariance matrices equal to V, and (c) setting all the off-diagonal elements of the class covariance matrices equal to zero. Thus, the covariance matrix according to this embodiment of the present invention is both isotropic and diagonal.

Used in conjunction with the above techniques for constraining the moduli of data vectors x and class means $w_j$, constraining the class covariances in this way gives the advantage of encouraging speech recognition algorithms to adopt novel encodings of speech data that may improve speech recognition performance (such as hierarchical sparse coding), and reducing the vulnerability of speech recognition algorithms to becoming trapped in undesirable sub-optimal configurations ('local minima') during training. Sparse coding results from representing individual speech-sounds as assemblies of many small isotropic Gaussian hypercircles tiling the unit hypersphere in the spectral-vector space, offering in the potential for more faithful representation of highly complex-shaped speech-sounds than is permitted by representation as a single anisotropic ellipsoid, and thus improved classification performance.

Because this constraint does away with the need for the conventional unconstrained re-estimation of the covariance matrices, FIG. 5's modified procedure for optimising GMMs does not involve re-estimation of covariance matrices as does the conventional procedure of FIG. 2.

In the case wherein the covariance matrix is constrained to be isotropic, it is well known that each class likelihood of a GMM (from which the GMM's posterior probabilities are derived via the well-known Bayes' theorem) is calculated from the modulus of the vector difference |x−w| between the data-encoding vector x and the appropriate class mean w. It is well known that these quantities can be derived from the scalar product x·w of the data-encoding vector x and the class mean w, from the relation $|x-w|^2 = |x|^2 + |w|^2 - 2x\cdot w$. In the case of an exponential mixture model, the class likelihoods are computed directly from the scalar product x·w. In cases where a set {w} of N class means are equivalent to one another by translation transformations (such as 2-dimensional translations in an image plane in cases when the data-encoding vectors represent images or 1-dimensional translations in time in cases when the data-encoding vectors represent 1-dimensional time signals), the well-known "correlation theorem" provides a much more computationally efficient means of calculating the corresponding set {x·w} of N scalar products with a given data-encoding vector x than is provided by performing N scalar product operations explicitly; the equivalent result may instead be obtained by computing the inverse Fourier transform of the component-wise product of the Fourier transform of x with the direction-reverse of the Fourier transform of w. In this way the desired result {x·w} may be obtained in the order of N·log(N) steps instead of $N^2$ steps. Further details of this can be found in the prior art of C. J. S. Webber, "Signal Processing Technique", PCT publication No. WO 01/61526. The present invention may be applied to GMMs and/or GMM-based HMMs regardless of whether or not the correlation theorem is used to accelerate the computation of a such a set of translation-related scalar products {x·w}.

A further constraint imposed on this embodiment of the current invention relates to the choice of prior class probabilities. The N prior probabilities Pr(j) for the GMM classes j=1, . . . , N may be constrained to be constants, i.e. not optimised according to the conventional re-estimation procedures for prior class probabilities (such as the EM algorithm for GMMs and the Baum-Welch procedure for GMM-based HMMs), but are defined once and for all by the step of setting $$Pr(j) = 1/N \text{ for all classes } j=1, \ldots, N \quad \text{(Equation 7)}$$

Used in conjunction with the above innovations for constraining the moduli of data vectors x, class means $w_j$ and the covariance matrices $C_j$, constraining the prior class probabilities in this way gives the advantage of reducing the vulnerability of speech recognition algorithms to becoming trapped in undesirable sub-optimal configurations ('local minima')

during training. Because this innovation does away with the need for the conventional unconstrained re-estimation of the prior class probabilities, FIG. 5's modified procedure for optimising GMMs does not involve re-estimation of prior class probabilities as does the conventional procedure of FIG. 2.

It will be understood by people skilled In the relevant arts that the constraints applied to a GMM or HMM as described above in the training phase of the model will equally need to be applied during the classifying phase of use of the models. If they were employed during training, the steps for encoding spectral shape and overall loudness according to the present invention as described above will need to be applied to every spectral vector of any new speech to be classified.

Figure 6:
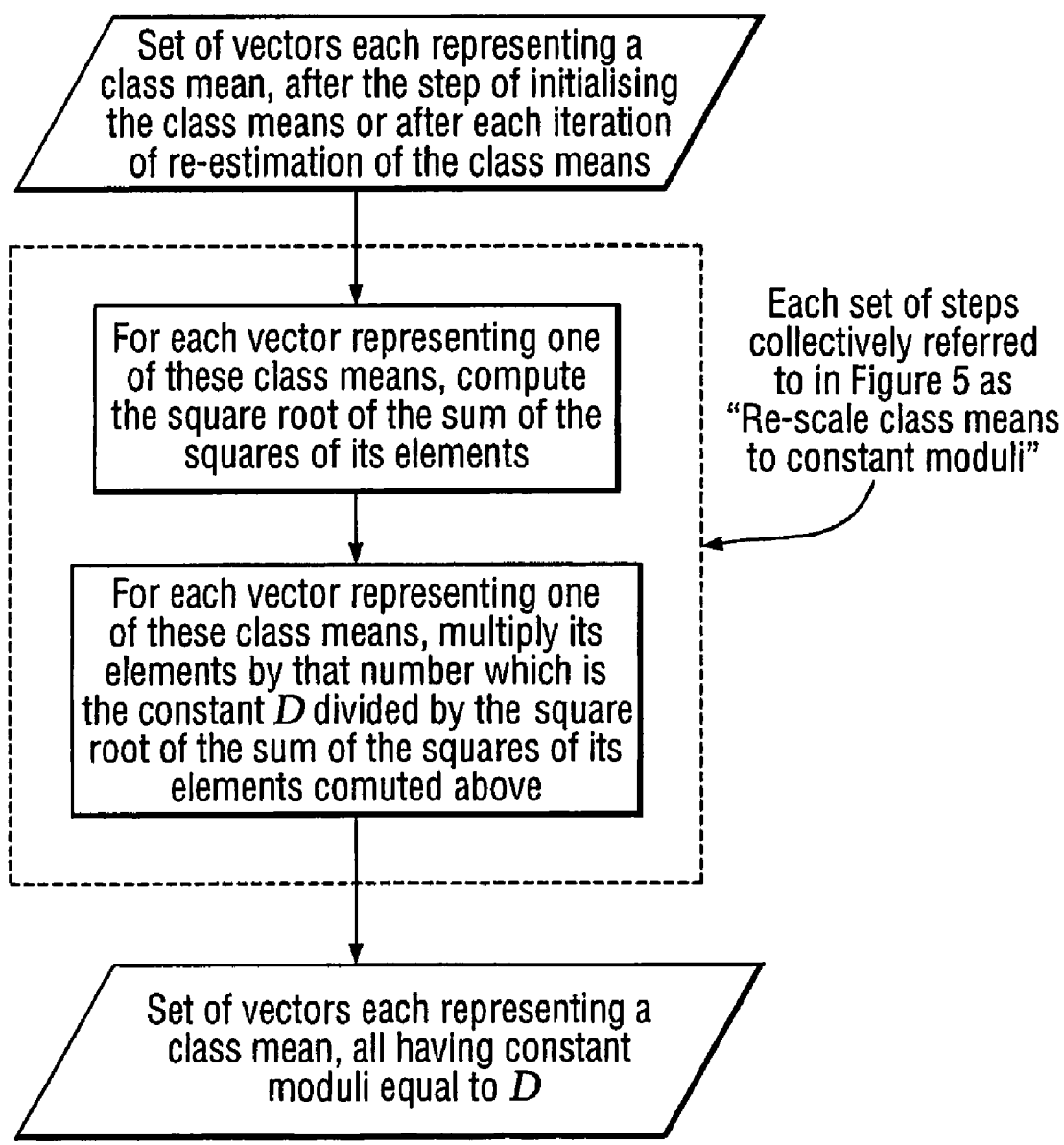
FIG. 6 shows in more detail the class mean re-scaling constraint shown in FIG. 5.
Figure 7:
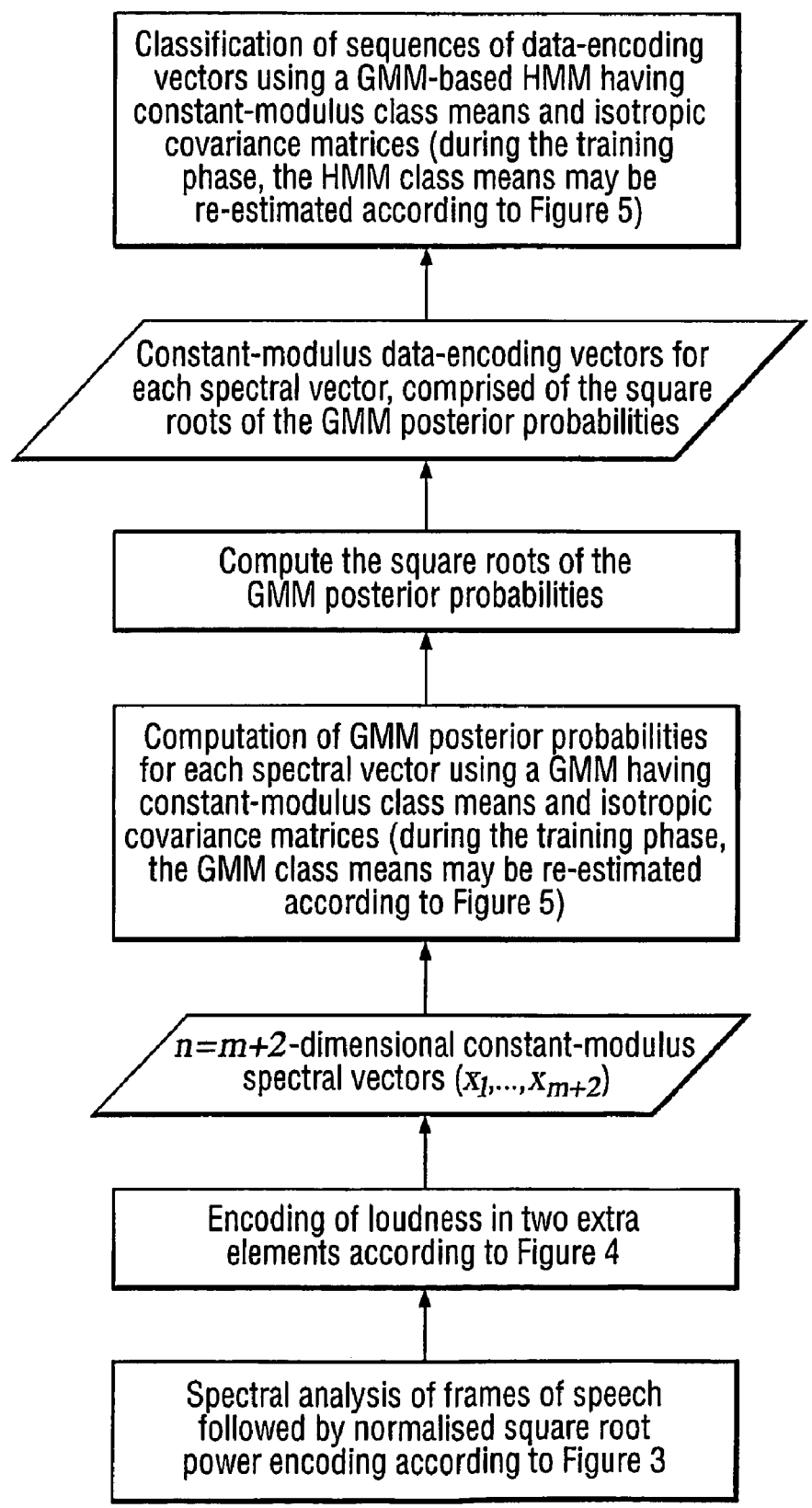
FIG. 7 shows in block diagrammatic form the implementation of a complete system.

An implementation of the invention, which combines all of the constraints detailed above, is illustrated in FIG. 6. This implementation uses conventional spectral analysis of each frame of speech, followed by novel steps described above to encode both spectral shape and overall loudness into each spectral vector and to scale every spectral vector's modulus to the constant value of 1. The parameters A and B are both set to equal $1/\sqrt{2}$ and D is set equal to 1.

Such unit-modulus spectral vectors are input to a GMM having a hundred Gaussian classes (N=100), with class means all constrained to have moduli equal to 1, with class prior probabilities all constrained to have constant and equal values of 1/100, and covariance matrices constrained to be isotropic and to have constant variances (i.e. not re-estimated at each iteration according to a procedure such as the EM algorithm). A good choice for that constant variance V has been found to be 0.01, although other values could be chosen by trial and error so as to give best speech classification performance of the whole system; the right choice for V will lie between 0 and 1. For each spectral vector input to this GMM, posterior probabilities for the classes are computed in the conventional way.

Each set of GMM posterior probabilities computed above for each spectral vector are used to compute unit-modulus data-encoding vectors for input to an ordinary GMM-based HMM by taking the square roots of those posterior probabilities.

These unit-modulus data-encoding vectors are input to the HMM as observation vectors. The class means of the Gaussian mixture that constitutes the parameterisation of the HMM's observation probabilities are all constrained to have moduli equal to 1. The number N of Gaussian classes used to parameterise the HMM's observation probabilities is chosen by trial and error so as to give best speech classification performance of the whole system. The prior probabilities of those classes are then determined by that choice of N; they are all constrained and set equal to 1/N. The covariance matrices of those classes are all constrained to be isotropic and to have constant variances (i.e. not re-estimated unconstrained according to a procedure such as the EM algorithm). The choice of that constant variance V would be determined by trial and error so as to give best speech classification performance of the whole system; the right choice for V will lie between 0 and 1.

The preferred implementation of the invention can be operated in training mode and classification mode. In classification mode, the HMM is used to classify the input observation vectors according to a conventional HMM classification method (Baum-Welch forward-backward algorithm or Viterbi algorithm), subject to the modifications described above.

In training mode, (a) the GMM is optimised for the training of unit-modulus spectral vectors (encoded as described above) according to a conventional procedure for optimising GMM class means (e.g. the EM re-estimation algorithm), subject to the innovative modifications to re-scale the GMM class means to have constant moduli equal to 1, and to omit the conventional steps for re-estimating the GMM class covariance matrices and prior class probabilities. (b) Once the GMM has been optimised, it is used as described above to compute a set of data-encoding vectors from the training set of speech spectral vectors. (c) This set of data-encoding vectors is then used for training the HMM according to a conventional procedure for optimising HMM class means (e.g. the Baum-Welch re-estimation procedure), subject to the innovative modifications to re-scale the HMM class means to have constant moduli equal to 1, and to omit the conventional steps for re-estimating the HMM class covariance matrices and prior class probabilities. No modification is made to the conventional steps for re-estimating HMM transition probabilities; the conventional Baum-Welch re-estimation procedure may be used for re-estimating HMM transition probabilities.

Figure 8:
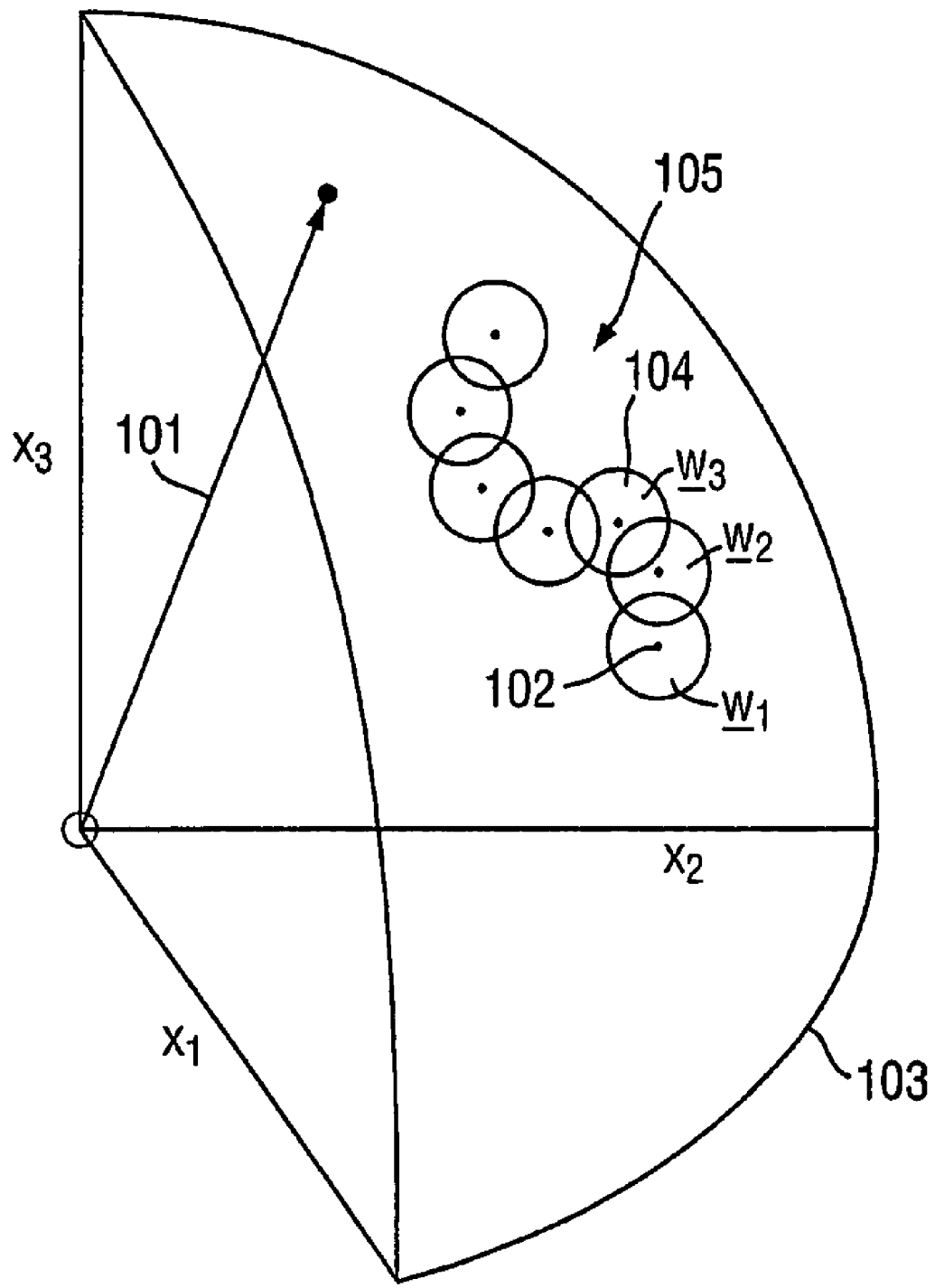
FIG. 8 shows graphically one advantage of the current invention using the example of a simplified three dimensional input vector space.

FIG. 8 illustrates the advantage of employing the constraints of the current invention. This shows a spectral vector $x=(x_1, x_2, x_3)$, where $|x|=1$. Constraining this spectral vector, e.g. 101 into having a constant modulus has the implication that the class means 102 will all lie on the surface of a hypersphere. In the case shown the hypersphere has two dimensions, and so is an ordinary 2-sphere 103 in an ordinary three-dimensional space. Constraining the covariance matrices to be isotropic and diagonal has the effect that the individual classes will project onto this hypersphere in the form of circles 104. This arrangement allows individual speech-sounds to be represented in the spectral-vector space not as individual Gaussian ellipsoids, as is conventional, but as assemblies 105 of many smaller Gaussian hypercircles 104 tiling the unit hypersphere 103, offering in the potential for more faithful representation of highly complex-shaped speech-sounds, and thus improved classification performance. Each class (hypercircle) eg 104 will span just a small area within the complex shape that delimits the set of all spectral vectors (which must all lie on the spectral-vector hypersphere 103) that could correspond to alternative pronunciations of a particular individual speech-sound; collectively, many such classes 104 will be able to span that whole complex shape much more faithfully than could a single, anisotropic ellipsoid as is conventionally used to represent an individual speech sound. Other sets of Gaussian classes within the same mixture model will be able to span parts of other complex shapes on the spectral vector hypersphere, i.e. of other speech sounds. The posterior probabilities associated with each of these Gaussian classes (hypercircles) is a measure of how close the current spectral vector is (on the spectral-vector hypersphere) to the corresponding Gaussian class mean 102 (hypercircle centre). Learning which sets of classes correspond to which speech sounds, on the basis of all the temporal correlations between them that are present in the training speech sequences, is the function of the GMM-based HMM, whose inputs are fed from the set of all those posterior probabilities.

To use an analogy, a large number of hypercircles helps one to avoid local minima far better than would a small number of anisotropic ellipsoids, for effectively the same reason that a bunch of sticks gets tangled more easily than a tray of marbles. (In this analogy, minimising the total gravitational potential of the set of marbles plays the analogous role to maximising the model likelihood.) Similarly, one can map out highly complex shapes much more faithfully by using a lot of marbles than by using a few sticks.

The skilled person will be aware that other embodiments within the scope of the invention may be envisaged, and thus the invention should not be limited to the embodiments as herein described.

REFERENCES

A. R. Webb, *Statistical Pattern Recognition*, Arnold (London), 1999.

B. H. Juang & L. R. Rabiner, *Hidden Markov models for speech recognition*, Technometrics 33(3), American Statistical Association, 1991.

The invention claimed is:

1. A signal processing system for processing a plurality of multi-element data encoding vectors, the system:
   having means for deriving the data encoding vectors from input signals;
   being arranged to process the data encoding vectors using a Gaussian Mixture Model (GMM) based Hidden Markov Model (HMM), the GMM based HMM having at least one class mean vector having multiple elements;
   being arranged to process the elements of the class mean vector(s) by an iterative optimisation procedure;
   characterised in that the system is also arranged to scale the elements of the class mean vector(s) during the optimisation procedure to provide for the class mean vector(s) to have constant modulus at each iteration, and to normalise the data encoding vectors input to the GMM based HMM.

2. A system as claimed in claim 1 wherein the GMM based HMM has a covariance matrix, the elements of which remain constrained during the optimisation procedure such that the matrix is isotropic and diagonal, and the value of the non zero diagonal elements remain constant throughout the optimisation procedure.

3. A system as claimed in claim 1 wherein prior class probabilities associated with the GMM based HMM are constrained to be equal, and to remain unchanged throughout the optimisation procedure.

4. A system as claimed in claim 1 wherein the data encoding vectors are normalised such that the vectors have equal moduli.

5. A system as claimed in claim 4 wherein the modulus of each data encoding vector is independent of the overall spectral power in the vector.

6. A system as claimed in claim 4 wherein elements forming spectral coefficients of a data encoding vector are arranged to be individually proportional to the square root of the power in their corresponding spectral band divided by the square root of the overall power contained in spectral bands represented in the vector.

7. A system as claimed in claim 4 wherein the system is arranged to add at least one additional element to each data encoding vector, wherein the added element(s) encode the overall power contained in spectral bands represented in the vector.

8. A system as claimed in claim 7 wherein the system is arranged to add two elements to each data encoding vector to represent the overall power in spectral bands, these two elements arranged such that the sum of their squares is a constant across all data encoding vectors that represent the spectrum of the input signal.

9. A system as claimed in claim 1 wherein the GMM based HMM provides the observation probabilities for a higher level HMM.

10. A system as claimed in claim 1 wherein the derivation of the data encoding vectors from the input signal involves the use of a low level GMM, whereby this low level GMM provides the data encoding vectors to the GMM based HMM that comprise elements derived from the low level GMM's posterior probabilities.

11. A system as claimed in claim 10 wherein elements of the data encoding vectors input from the low level GMM to the GMM based HMM are proportional to the square root of posterior probabilities of the low level GMM.

12. A system as claimed in claim 10 wherein elements of the data encoding vectors input from the low level GMM to the GMM based HMM are proportional to posterior probabilities of the low level GMM.

13. A system as claimed in claim 9 wherein the constant values for the modulus of each of the class mean vectors may be different at each level.

14. A signal processing system for processing a plurality of multi-element data encoding vectors, the system:
   having means for deriving the data encoding vectors from input signals;
   being arranged to process the data encoding vectors using a Gaussian Mixture Model (GMM), the GMM having at least one class mean vector having multiple elements;
   being arranged to process the elements of the class mean vector(s) by an iterative optimisation procedure;
   characterised in that the system is also arranged to scale the elements of the class mean vector(s) during the optimisation procedure to provide for the class mean vector(s) to have constant modulus at each iteration, and to normalise the data encoding vectors input to the GMM.

15. A system as claimed in claim 14 wherein the GMM has a covariance matrix, the elements of which remain constrained during the optimisation procedure such that the matrix is isotropic and diagonal, and the value of the non zero diagonal elements remain constant throughout the optimisation procedure.

16. A system as claimed in claim 14 wherein prior class probabilities associated with the GMM are constrained to be equal, and to remain unchanged throughout the optimisation procedure.

17. A system as claimed in claim 14 wherein the data encoding vectors are normalised such that the vectors have equal moduli.

18. A system as claimed in claim 17 wherein the modulus of each data encoding vector is independent of the overall spectral power in the vector.

19. A system as claimed in claim 17 wherein elements forming spectral coefficients of a data encoding vector are arranged to be individually proportional to the square root of the power in their corresponding spectral band divided by the square root of the overall power contained in spectral bands represented in the vector.

20. A system as claimed in claim 17 wherein the system is arranged to add at least one additional element to each data encoding vector, wherein the added element(s) encode the overall power contained in spectral bands represented in the vector.

21. A system as claimed in claim 20 wherein the system is arranged to add two elements to each data encoding vector to represent the overall power in spectral bands, these two elements arranged such that the sum of their squares is a constant across all data encoding vectors that represent the spectrum of the input signal.

22. A system as claimed in claim 14 wherein the derivation of the data encoding vectors from the input signal involves the use of a second, low level GMM, whereby this second GMM provides the data encoding vectors to the original GMM that comprise elements derived from the second GMM's posterior probabilities.

23. A system as claimed in claim 22 wherein elements of the data encoding vectors input from the second GMM to the original GMM are proportional to the square root of posterior probabilities of the second GMM.

24. A system as claimed in claim 22 wherein elements of the data encoding vectors input from the second GMM to the original GMM are proportional to posterior probabilities of the second GMM.

25. A system as claimed in claim 22 wherein the constant values for the modulus of each of the class mean vectors may be different at each level.

26. A method of processing a signal, the signal comprising a plurality of multi-element data encoding vectors, wherein the data encoding vectors are derived from an analogue or digital input, and where the method employs at least one Gaussian Mixture Model (GMM) or GMM based Hidden Markov Model (HMM), the GMM or GMM based HMM having at least one class mean vector having multiple elements, and the elements of the class mean vector(s) are optimised in an iterative procedure, characterised in that the elements of the class mean vectors are scaled during the optimisation procedure such that the class mean vectors have a constant modulus at each iteration, and the data encoding vectors input to the GMM or GMM based HMM are processed such that they are normalised.

27. A method as claimed in claim 26 wherein a covariance matrix within the GMM or GMM based HMM has one or more elements, all of which are constrained during the optimisation procedure such that the matrix is isotropic and diagonal, and the value of its non zero elements remain constant throughout the optimisation procedure.

28. A method as claimed in claim 26 wherein prior class probabilities associated with the GMM or GMM based HMM are constrained to be equal, and to remain unchanged throughout the optimisation procedure.

29. A method as claimed in claim 26 wherein the data encoding vectors are scaled in a pre-processing stage before being input to the GMM or GMM based HMM, such that the moduli of all data encoding vectors are equal.

30. A method as claimed in claim 29 wherein the modulus of each data encoding vector is independent of the overall power in the vector.

31. A method as claimed in claim 29 wherein elements forming spectral coefficients of a data encoding vector are arranged to be individually proportional to the square root of the power in their corresponding spectral band, divided by the square root of the overall power contained in spectral bands represented in the vector.

32. A method as claimed in claim 29 wherein at least one additional element is added to each data encoding vector, wherein the added element(s) encode the overall power contained in spectral bands represented in the vector.

33. A method as claimed in claim 32 wherein two elements are added to each data encoding vector to represent the overall power in spectral bands, these two elements arranged such that the sum of their squares is a constant across all input vectors that represent the spectrum of the input signal.

34. A method as claimed in claim 26 wherein the GMM or GMM based HMM provides the observation probabilities for a higher level HMM.

35. A method as claimed in claim 26 wherein the derivation of the data encoding vectors from the input signal involves the use of a low level GMM, whereby this low level GMM provides the data encoding vectors to the GMM or GMM based HMM that comprise elements derived from the low level GMM's posterior probabilities.

36. A method as claimed in claim 35 wherein elements of the data encoding vectors input from the low level GMM to the GMM or GMM based HMM are proportional to the square root of posterior probabilities of the low level GMM.

37. A method as claimed in claim 35 wherein elements of the data encoding vectors input from the low level GMM to the GMM or GMM based HMM are proportional to posterior probabilities of the low level GMM.

38. A method as claimed in claim 34 wherein the constant values for the modulus of each of the class mean vectors may be different at each level.

39. A signal processing system that has been trained according to the method as described in claim 26.

40. A computer programmed to implement a signal processing system for processing one or more multi-element input vectors, the system:
having means for deriving the data encoding vectors from input signals;
being arranged to process the data encoding vectors using a at least one of a Gaussian Mixture Model (GMM) and a GMM based Hidden Markov Model (HMM), the GMM or GMM based HMM having at least one class mean vector having multiple elements;
being arranged to process the elements of the class mean vector(s) by an iterative optimisation procedure;
characterised in that the system is also arranged to scale the elements of the class mean vector(s) during the optimisation procedure to provide for the class mean vector(s) to have constant modulus at each iteration, and to normalise the data encoding vectors input to the GMM or GMM based HMM.

41. A speech recogniser incorporating a signal processing system for processing one or more multi-element input vectors, the recogniser:
having means for deriving the data encoding vectors from input signals;
being arranged to process the data encoding vectors using at least one of a Gaussian Mixture Model (GMM) and a GMM based Hidden Markov Model (HMM), the GMM or GMM based HMM having at least one class mean vector having multiple elements;
being arranged to process the elements of the class mean vector(s) by an iterative optimisation procedure;
characterised in that the system is also arranged to scale the elements of the class mean vector(s) during the optimisation procedure to provide for the class mean vector(s) to have constant modulus at each iteration, and to normalise the data encoding vectors input to the GMM or GMM based HMM.

* * * * *

UNITED STATES PATENT AND TRADEMARK OFFICE
CERTIFICATE OF CORRECTION

PATENT NO. : 7,664,640 B2 Page 1 of 1
APPLICATION NO. : 10/509527
DATED : February 16, 2010
INVENTOR(S) : Christopher John St. Clair Webber It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1193 days.

Signed and Sealed this

Thirtieth Day of November, 2010

David J. Kappos
*Director of the United States Patent and Trademark Office*